Dec. 22, 1931.  E. V. FRANCIS  1,837,260

TAKE-UP JOURNAL BEARING

Filed March 27, 1929

Patented Dec. 22, 1931

1,837,260

UNITED STATES PATENT OFFICE

EARLE V. FRANCIS, OF COLUMBUS, OHIO, ASSIGNOR TO THE JEFFREY MANUFACTURING COMPANY, OF COLUMBUS, OHIO, A CORPORATION OF OHIO

TAKE-UP JOURNAL BEARING

Application filed March 27, 1929. Serial No. 350,358.

The present invention relates to new and useful improvements in takeup journal bearings of that general class which are movable along a support to adjust the position of the journal supported shaft relative to other elements of the machine.

One of the particular objects of this invention is to provide an improved journal bearing of the class described which shall be durable; convenient of assembly and adjustment; simple and rigid of construction, and economical to manufacture.

In the following specification and in the accompanying drawings, I have shown, for illustrative purposes, one embodiment of my invention. It will be understood that this disclosure is not restrictive, as the invention is capable of mechanical embodiments other than the specific one shown.

In the drawings:—

Figure 1:
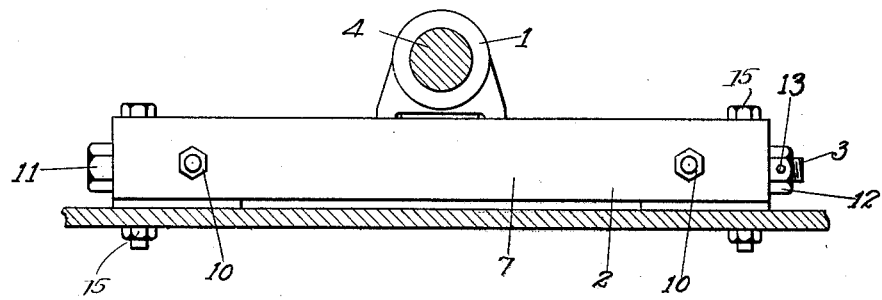
Fig. 1 is a side elevation of one embodiment of my invention.

Referring to the drawings by numbers, in which like numerals refer to similar parts in the several figures, my improved takeup journal bearing comprises a support or journal bearing 1, and a supporting and guiding frame 2, relative to which said bearing is movable under the control of an adjusting screw 3. The support 1 may be of any type of bearing or other support suitable to the purposes for which the device is to be used. As here shown, in order to illustrate the invention by one example, the bearing 1 consists of a simple metallic sleeve adapted to rotatively support a shaft 4, which may require movement relative to its supporting frame for adjustment. The sleeve 1 is preferably, although not necessarily, formed integral with a base portion 5 having grooves to receive the horizontally projecting flanges 6 of spaced-apart supports, formed in the guide angle bars 7. The supports 7 extend in parallel relation and are joined in any suitable manner, as here shown by two castings 8 and 9, to which they are secured by bolts 10 and which hold them in spaced-apart relation. As here shown, and preferably, the sleeve 1 has reduced bearing portions 1a which rest and ride upon flanges 6 of the members 7, so as to reduce friction and yet give a stable support.

The base portion 5 of the sleeve 1 forms a nut-housing and is traversed by a screw-threaded rod 3, here shown as disposed at right angles to the longitudinal axis of the shaft seat, and which moves freely in the apertures in base member 5 and engages a nut 14 which is loosely mounted in the nut-housing portion 5. The ends of said rod 3 are supported in any suitable fashion, in the present showing being carried in aligned apertures in the castings 8 and 9.

It will be seen that the box-like castings or spacing blocks 8 and 9 have the end walls 8a and 9a, respectively, through which the rod 3 passes. This gives a plural point support for each end of the rod 3, which tends to maintain it in aligned and rigid relation to the other parts.

Figure 2:
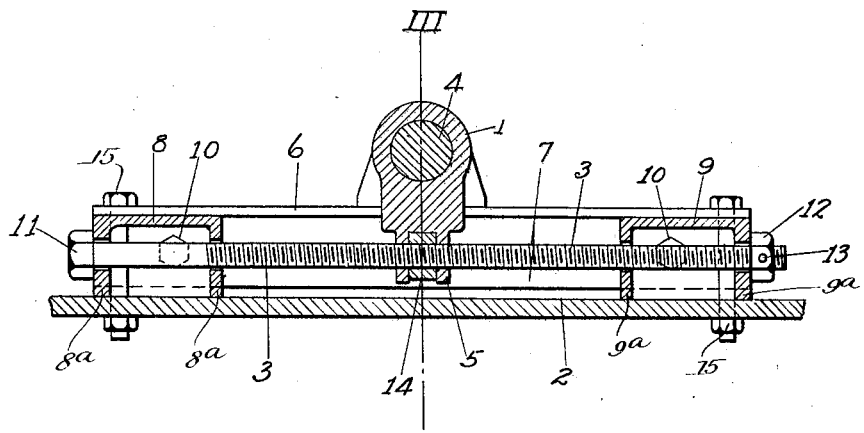
Fig. 2 is a sectional view taken along the longitudinal central vertical plane of the device illustrated in Fig. 1.
Figure 3:
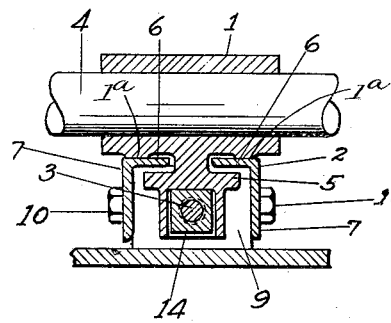
Fig. 3 is a sectional view taken along the line III—III of Fig. 2.

The blocks 8 and 9, and the supports 7, will be fastened in place on the frame member 2 in any suitable manner, the means here shown comprising the bolt and nut fastenings 15, passing through the flanges 6, blocks 8 and 9, and member 2. It will be seen that blocks 8 and 9 not only space members 7 apart, but also space them away from the support 2 (see Fig. 2) so as to give cleaning access and clearance to the parts.

At one end of the rod 3 is formed a head 11 or other formation, adapted to be engaged by a suitable tool, as a wrench, whereby the rod may be rotated about its longitudinal axis, and at the other end there is fitted a nut 12, or other stop device, which is secured against accidental displacement by suitable means, as a cotter pin 13.

These parts are so proportioned and arranged that the head 11 and nut 12 engage the end walls of the blocks 8 and 9 to prevent longitudinal movement of the rod 3.

The nut 14 which fits into a recess of the housing serves to hold the bearing 1 in place upon the supports 7, and rotation of the rod 3 causes the nut 14 to travel along said rod and move the bearing 1 along the supports. The rod 3 being anchored at one end by engagement with the block 8 and at the other end by engagement with the block 9, any tendency of the bearing 1 to move will result in merely tensioning said rod, which is, of course, a strain said rod member is best able to withstand. This permits much lighter construction without loss of efficiency, and does away with cumbersome and heavy anchoring devices and means to resist strains on the bearing parts.

It will be observed that the movable journal box 1 has a relatively extended bearing contact, longitudinally and transversely of the supporting flanges 6, and that the nut-housing 5 with its operating nut 14 is centrally and symmetrically disposed relative to the mass (box 1) to be moved. The extended bearing contact and symmetrically disposed point of application of power, minimizes any tendency of the box to tilt and bind when the screw 3 is rotated to actuate the nut and move the mass. This is an important feature of the development. Furthermore, by arranging the screw 3 with the plural point supports in the spacer blocks 8 and 9, the active portion of the screw between the blocks is maintained in a more rigid condition and tendency of the screw to buckle and distort under strain is eliminated.

From the foregoing, it will be seen that an adjustable bearing support is provided which is made up of few parts, readily assembled and taken down, and one which is of rugged construction without being heavy or cumbersome.

What I claim is:

1. In a device of the class described, the combination of spaced apart supporting members, separated spacer elements secured to said members to maintain them in spaced-apart relation, a bearing member movable upon said supporting members, a part extending from said bearing member between said spaced-apart members, and longitudinally disposed rotatable means engaging said extended part to cause said bearing member to move relative to said supporting member.

2. In a device of the class described, the combination of spaced-apart supporting members, separated spacer elements secured to said members to maintain them in spaced-apart relation, a bearing member movable upon said supporting members, a part extending from said bearing member between said spaced-apart members, and a longitudinally disposed screw engaging said extended part and rotatable to cause said bearing member to move relative to said supporting members.

3. In a device of the class described, the combination of spaced-apart supporting members, separated spacer elements secured to said members to maintain them in spaced-apart relation, a bearing member movable upon said supporting members, a nut housing extending from said bearing member between said spaced-apart members, a nut loosely mounted in said housing, and a rotatable screw disposed longitudinally of said supporting members and engaging said nut to cause said bearing member to move relative to said supporting members.

4. In a device of the class described, the combination with supporting members having flanges, separated spacer elements secured to said supporting members to maintain the flanges in spaced apart relation, a bearing member provided with flange receiving grooves movable upon said flanges, a nut housing extending from said bearing member and disposed below said flanges, a nut loosely mounted in said housing, and a threaded rod having its ends rotatably mounted in said spacer blocks to engage said nut and move said bearing member relative to said supporting members.

5. In a device of the class described, the combination of a pair of supporting members substantially L-shaped in cross section, separated spacer elements secured to said members to hold their flanges in spaced-apart relation, a bearing member provided with flange receiving grooves supported and movable upon said flanges, a nut housing extending from said bearing member and disposed between the said supporting members and below said spaced-apart flanges, a nut loosely mounted in said housing, and a threaded rod rotatably mounted in said spacer elements and fixed against longitudinal movement to engage said nut and move said bearing member relative to said supporting members.

6. In a device of the class described, the combination of supporting members of substantially L-shape in cross section, of separated spacer blocks having apertures in their end walls between said bearing members to maintain their flanges in spaced-apart relation, a bearing member mounted and movable on the flanges of said supporting members and provided with flange receiving grooves, an internal nut housing extending from said bearing member between said supporting members and below said flanges, a nut loosely mounted in said end housing, and a threaded rod, the ends of which are supported by the end walls of said spacer blocks, rotatably mounted but fixed against longitudinal movement to engage said nut and move said bearing member relative to said supporting members.

7. In a device of the class described, the combination of a supporting base, two supporting members substantially L-shape in cross section, spacer elements secured to said supporting members to maintain the flanges of said members in spaced apart relation, means for securing said supporting members and elements to said base member, a bearing member mounted and movable upon the flanges of said supporting members and provided with flange receiving grooves, a nut housing extending from said bearing member between said supporting members and below said flanges, a nut loosely mounted in said nut housing, and a threaded rod rotatably mounted in said spacer elements but fixed against longitudinal movement to engage said nut and move said bearing relative to said supporting members.

8. In a device of the class described, the combination of a supporting base, two supporting members substantially L-shaped in cross section, spacer elements secured to said supporting members to maintain the flanges of said members in spaced apart relation and to hold them spaced from said base member, means for securing said supporting members and elements to said base member, a bearing member mounted and movable upon the flanges of said supporting members and provided with flange receiving grooves, a nut housing extending from said bearing member between said supporting members and below said flanges, a nut loosely mounted in said nut housing, and a threaded rod rotatably mounted in said spacer elements but fixed against longitudinal movement to engage said nut and move said bearing relative to said supporting members.

9. In a device of the class described, the combination of spaced apart supporting members, separated spacer elements secured to said members to maintain them in spaced apart relation, a support movable upon said supporting members, a part extending from said support between said spaced apart members, and means engaging said part to cause said support to move relative to said supporting members.

10. In a device of the class described, the combination of spaced apart supporting members, separated spacer elements secured to said members to maintain them in spaced apart relation, said elements having portions extending beyond adjacent portions of said members, a support movable upon said supporting members, a part extending from said support between said spaced apart members, and means engaging said part to cause said support to move relative to said supporting members.

11. In a device of the class described, the combination of spaced apart supporting members, separated spacer elements secured to said members to maintain them in spaced apart relation, said spacer elements each having a pair of spaced walls with registering apertures, a support movable upon said supporting members, a part extending from said support between said spaced apart members, and longitudinally disposed rotatable means supported in said registering apertures and engaging said extended part to cause said support to move relative to said supporting members.

In testimony whereof I have hereunto set my hand.

EARLE V. FRANCIS.